United States Patent [19]

Iuchi et al.

[11] Patent Number: 4,465,382
[45] Date of Patent: Aug. 14, 1984

[54] METHOD OF AND AN APPARATUS FOR MEASURING SURFACE TEMPERATURE AND EMMISSIVITY OF A HEATED MATERIAL

[75] Inventors: Tohru Iuchi, Kawasaki; Kunitoshi Watanabe, Fukuoka; Toshihiko Shibata, Tokai; Tetsuro Kawamura, Kitakyushu, all of Japan

[73] Assignee: Nippon Steel Corporation, Tokyo, Japan

[21] Appl. No.: 239,727

[22] Filed: Mar. 2, 1981

[30] Foreign Application Priority Data

Mar. 4, 1980 [JP] Japan .................................. 55-27108
Jul. 11, 1980 [JP] Japan .................................. 55-94594

[51] Int. Cl.³ .......................... G01J 5/10; G01K 13/06
[52] U.S. Cl. ........................................... 374/9; 374/126
[58] Field of Search ...................... 73/355 EM, 355 R; 374/9, 126

[56] References Cited

U.S. PATENT DOCUMENTS 3,057,200 10/1962 Wood ............................ 73/355 EM
3,277,715 10/1966 Vanderschmidt ...................... 374/9
4,144,758 3/1979 Roney ................................. 374/126
4,172,383 10/1979 Iuchi ............................. 73/355 EM

FOREIGN PATENT DOCUMENTS 53-38390 4/1978 Japan .
54-85078 7/1979 Japan .
54-180784 12/1979 Japan .

OTHER PUBLICATIONS

Bernard; Determining Emissivity; Instrument Control Systems; pp. 87–89; May 1964.

Primary Examiner—Charles Frankfort
Assistant Examiner—Denis E. Corr
Attorney, Agent, or Firm—Pollock, Vande Sande and Priddy

[57] ABSTRACT

When a steel sheet or the like is heated in a furnace to a temperature somewhat higher than the room temperature and is still or moved, its temperature can be measured by detecting the radiant energy therefrom. The measurement is normally difficult due to the influence of background noise of radiant energy from the surroundings, change of the transmittance factor of the environment or atmosphere for radiant energy, and change of the emissivity of the object to be measured. In order to remove such causes of errors and to correctly measure the temperature by detecting radiant energy, a radiometer and a black body radiator are disposed symmetrically and specularly with respect to the normal to a surface of an object to be measured, and two different amounts of radiant energies are emitted from the black body radiator, and the emissivity of the object to be measured is determined from the detected values from the radiometer, the two temperature values of the black body radiator, and the diffusely reflecting factor associated with the object to be measured, whereby correct measurement of the surface temperature of the object to be measured can be done. Embodiments for implementing this method are proposed.

15 Claims, 25 Drawing Figures

METHOD OF AND AN APPARATUS FOR MEASURING SURFACE TEMPERATURE AND EMMISSIVITY OF A HEATED MATERIAL

BACKGROUND OF THE INVENTION

This invention relates to a method of and an apparatus for radiation temperature measurement for measuring the temperature of a heated object such as a steel plate or the like, the emissivity of which changes, and more particularly to a method and an apparatus for accurately measuring the surface temperature of the object by measuring both the surface temperature and the emissivity of the object, simultaneously.

More particularly, this invention relates to the following method and the apparatus for performing the method.

In a temperature measurement by radiation thermometry in an industrial furnace such as a continuous annealing furnace or the like in which a steel plate or other object is heated or in a metal at an ordinary ambient atmospheric temperature wherein the temperature is measured by detecting the radiation therefrom, several factors such as the radiant energy from the surroundings or the background noise the magnitude of which is equal to or above the radiant energy from the object to be measured and the change of the transmittance factor of the atmosphere surrounding the measuring arrangement for the radiant energy, together with the change of the emissivity of the object to be measured, will interfere with such measurement to degrade or render the conventional radiation temperature measurement impossible to carry out. These problems can effectively be solved by a radiation temperature measuring method with which this invention is more particularly concerned.

For the measurement of the surface temperature of a heated object which stands still or is moved in an industrial furnace, a radiation thermometer or radiometer capable of measuring the temperature of the object without necessitating direct contact with the object can be conveniently used. In fact, this kind of device is employed in many related fields. In a furnace, since the radiant energy coming from its wall or heat source is reflected from the object to be measured and then detected by the radiometer, such stray radiation energy becomes a great external interference or noise. This stray radiation energy must be excluded, otherwise correct temperature measurement is impossible. In addition, it is well known that when the emissivity of the object to be measured changes, the radiation thermometry measurement will generally cause a large error. The two problems as mentioned above, in effect, often make radiation temperature measurements in furnaces very erroneous. Particularly when the object to be measured is a thin or thick steel plate placed in an annealing furnace, its surface is normally oxidized while it is being heated in the furnace, accordingly the emissivity of the steel plate changes with the progression of the oxidation, thereby causing a large error in the radiation temperature measurement. This fact substantially invalidates the temperature measurement. The same situation occurs upon radiation temperature measurement of a metal having an ambient atmospheric temperature. The reason for this is that since the object to be measured (for example, metal) is at around ordinary temperatures, the radiant energy from the surface of the metal is often equal to or below the radiant energy from the surroundings.

Moreover, when the atmosphere of the measuring system absorbs radiant energy in the wavelength range which the radiometer being used can detect, and when the transmittance factor for the radiant energy is changed by a change in the concentration of the atmosphere, the radiation temperature measurement will again be subjected to large errors.

SUMMARY OF THE INVENTION

In view of these serious troubles encountered, it is an object of the present invention to provide a method and an apparatus for accurately measuring the surface temperature at all times under such an environment by solving the problems concerning the radiation temperature measurement caused in the above-mentioned environment.

One of the inventors of the present invention has proposed a method of correctly measuring temperature, by which the above problems in the radiation temperature measurement have been obviated, to some extent, as disclosed in Japanese Laid-Open Patent Application No. 85078/1979. In accordance with this earlier method, a black body radiator of which the temperature is variable, and a radiometer which can detect radiant rays of a selected band of wavelengths, are disposed symmetrically and specularly with respect to the normal to a heated object surface, so that the radiometer can detect the radiant ray from the heated object surface, and the temperature of the black body radiator is changed so that the radiator produces output values corresponding to the temperatures, which values are used to compute the emissivity of the heated body and then determine the surface temperature thereof. Therefore, this earlier major feature of the method is that a radiant ray of a wavelength to be detected by the radiometer is selected so as to be specularly reflected from the object surface to be detected. In contrast to this earlier method, the present invention proposes to measure the surface temperature of the object to be measured with a high precision even in the situation where the object surface to be measured is rough or a non-perfect specularly reflecting surface and that the environment of the measurement includes substances detrimental to the transmittance of radiant energy, such as $CO_2$, $H_2O$ and so on.

Moreover, an ideal black body furnace would have a large size and be necessary to be heated and maintained at a constant temperature. This invention further proposes a radiation temperature measurement utilizing specular reflection which is able to omit such as black body furance.

DETAILED DESCRIPTION OF THE INVENTION

Figure 1:
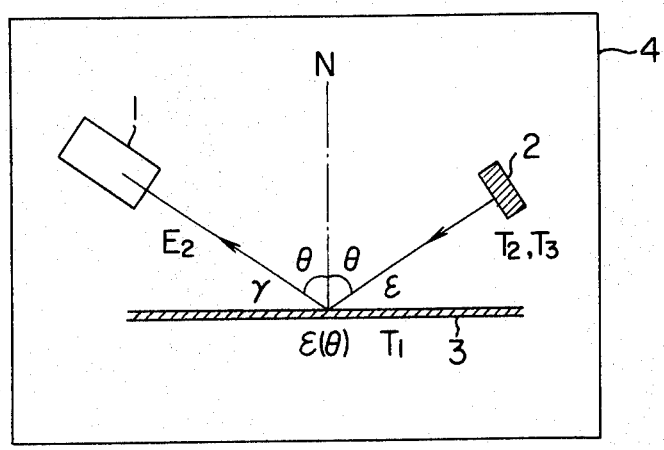
FIG. 1 is a schematic diagram of a first embodiment of the invention.

When the surface of an object to be measured is optionally smooth and flat, namely, has a perfect specularly reflecting surface, the following equation is satisfied:

$$\epsilon(\theta) + r(\theta) = 1 \tag{1}$$

where $\epsilon(\theta)$ represents the emissivity of the object in the direction of angle $\theta$ with respect to the normal N to the object surface, and $r(\theta)$ the reflectivity of the object in that direction. The principle of this method will now be described with reference to FIG. 1. A radiometer 1 and a black body radiator 2 are disposed specularly and symmetrically at angle $\theta$ with respect to the normal N to the surface of a mirror. If an object 3 to be measured is at a temperature $T_1$ and the black body radiator 2 is at a temperature $T_2$, a radiant energy $E_2$ to be detected by the radiometer 1 can be expressed by $$E_2 = \epsilon(\theta) \cdot E_b(T_1) + \{1 - \epsilon(\theta)\} \cdot E_b(T_2) \tag{2}$$

where $E_b(T_2)$ represents the radiant energy from the black body radiator at the temperature $T_2$. The first term on the right side of Eq. (2) means the energy radiated from the object 3 itself to be measured, and the second term thereon is a component of the radiant energy $E_b(T_2)$, which is specularly reflected from the surface of the object 3 (the reflectivity $r(\theta) = 1 - \epsilon(\theta)$).

Then, when the temperature of the black body radiator 2 is changed to $T_3$, the detected value, $E_3$ is given by $$E_3 = \epsilon(\theta) \cdot E_b(T_1) + \{1 - \epsilon(\theta)\} \cdot E_b(T_3) \tag{3}$$

Since Eqs. (2) and (3) are two equations both including unknown variables $\epsilon(\theta)$ and $E_b(T_1)$ to be determined, they can be solved as simultaneous equations with respect to $\epsilon(\theta)$ and $E_b(T_1)$. Subtraction of Eq. (3) from Eq. (2) on both sides will yield $$E_2 - E_3 = \{1 - \epsilon(\theta)\} \cdot \{E_b(T_2) - E_b(T_3)\} \tag{4}$$

Rearrangement of Eq. (4) will be reduced to $$\epsilon(\theta) = 1 - \frac{E_2 - E_3}{E_b(T_2) - E_b(T_3)} \tag{5}$$

Substitution of Eq. (5) into Eq. (3) and rearranging will result in $$E_b(T_1) = \frac{E_3}{\epsilon(\theta)} - \frac{1 - \epsilon(\theta)}{\epsilon(\theta)} \cdot E_b(T_3) \tag{6}$$

From Eq. (6), it will be seen that temperature $T_1$ can be determined from the output characteristic of the radiometer 1. The above theory can apply for the case where the object 3 has a perfect specularly reflecting surface. This method can be realized by Japanese Patent Laid-Open Application No. 85078/1979.

In general, however, since the surface of an object has a certain extent of roughness, the condition of measurement is not ideal. This situation implies that the reflectivity $r(\theta) = 1 - \epsilon(\theta)$ of Eq. (1) becomes smaller than that in the ideal because of the diffused reflection. Thus, if a coefficient f ($0 < f < 1$) is used to provide an apparent reflectivity as $$r(\theta, f) = \{1 - \epsilon(\theta)\} \cdot f$$

in place of $r(\theta)$, and Eqs. (2) and (3) are arranged, then Eqs. (7) and (8) are given as $$E_2 = \epsilon(\theta) \cdot E_b(T_1) + \{1 - \epsilon(\theta)\} \cdot f \cdot E_b(T_2) \tag{7}$$

$$E_3 = \epsilon(\theta) \cdot E_b(T_1) + \{1 - \epsilon(\theta)\} \cdot f \cdot E_b(T_3) \tag{8}$$

In this case, f is referred to as "specularly reflecting factor" which represents the degree of specular reflection. From the two equations given above, the calculated emissivity is determined by $$\epsilon(\theta) = 1 - \frac{E_2 - E_3}{f \cdot \{E_b(T_2) - E_b(T_3)\}} \tag{9}$$

The temperature is thus found from the expression $$E_b(T_1) = \frac{E_3}{\epsilon(\theta)} - \frac{1 - \epsilon(\theta)}{\epsilon(\theta)} \cdot f \cdot E_b(T_3) \tag{10}$$

A first feature of this invention is that accurate temperature measurement can easily be performed by introducing the specularly reflecting factor f even for the non-perfect specularly reflecting characteristic of the object to be measured, or rough surface for the wavelengths detectable by the radiometer.

In the measurement on the non-perfect specularly reflecting surface, when a surrounding wall 4 as shown in FIG. 1 is at such a high temperature that the radiation therefrom can not be neglected, it becomes necessary to take into account this background noise. With a surrounding wall temperature of $T_4$ having an effective emissivity of 1.0, Eqs. (7) and (8) are rewritten as $$E_2 = \epsilon(\theta) \cdot E_b(T_1) + \{1 - \epsilon(\theta)\} \cdot f \cdot E_b(T_2) + \{1 - \epsilon(\theta)\} \cdot p \cdot E_b(T_4) \tag{11}$$

$$E_3 = \epsilon(\theta) \cdot E_b(T_1) + \{1 - \epsilon(\theta)\} \cdot f \cdot E_b(T_3) + \{1 - \epsilon(\theta)\} \cdot p \cdot E_b(T_4) \quad (12)$$

where p represents the degree of the diffuse reflection from the surface 3 to be measured, and is denoted by inventors as "diffusely reflecting factor". The third terms on the right side of Eqs. (11) and (12) show radiant energy to be detected by the radiometer 1 after the radiant energy $E_b(T_4)$ from the surrounding wall 4 is diffusely reflected from the surface 3 to be measured.

Let the relation between p and f be determined. If, now, $T_1 = T_2 = T_3 = T_4 = T$, or if the temperature measuring system is in perfect thermal equilibrium condition, then $E_b(T_1) = E_b(T_2) = E_b(T_3) = E_b(T_4) = E_b(T)$. Therefore, Eqs. (11) and (12) are reduced to $$E_b(T) = \epsilon(\theta) \cdot E_b(T) + \{1 - \epsilon(\theta)\} \cdot f \cdot E_b(T) + \{1 - \epsilon(\theta)\} \cdot p \cdot E_b(T) \quad (13)$$

From Eq. (13), the following relationship is derived:

$$f + p = 1 \quad (14)$$

Substitution of Eq. (14) for Eqs. (11) and (12) will yield $$E_2 = \epsilon(\theta) \cdot E_b(T_1) + \{1 - \epsilon(\theta)\} \cdot (1 - p) \cdot E_b(T_2) + \{1 - \epsilon(\theta)\} \cdot p \cdot E_b(T_4) \quad (15)$$

$$E_3 = \epsilon(\theta) \cdot E_b(T_1) + \{1 - \epsilon(\theta)\} \cdot (1 - p) \cdot E_b(T_3) + \{1 - \epsilon(\theta)\} \cdot p \cdot E_b(T_4) \quad (16)$$

Substraction of one from the other of both equations and rearranging will give the same expression as Eqs. (9):

$$\epsilon(\theta) = 1 - \frac{E_2 - E_3}{(1 - p)\{E_b(T_2) - E_b(T_3)\}} \quad (17)$$

Substitution of the $\epsilon(\theta)$ for Eq. (16) will result in $$E_b(T_1) = \frac{E_3}{\epsilon(\theta)} - \frac{1 - \epsilon(\theta)}{\epsilon(\theta)} \cdot (1 - p) \cdot E_b(T_3) - \frac{1 - \epsilon(\theta)}{\epsilon(\theta)} \cdot p \cdot E_b(T_4) \quad (18)$$

Eqs. (17) and (18) show the principle for the measurement of the invention. In other words, the black body radiator 2 and the radiometer 1 are specularly sysmmetrically disposed at angles $\theta$ with respect to the normal N to the object surface 3 to be measured, and measurements are made as follows: The radiant energy from the black body radiator is changed to $E_b(T_2)$ or $E_b(T_3)$, and the sum of the radiant energy $(1 - \epsilon(\theta)) \cdot (1 - p) \cdot E_b(T_2)$ or $(1 - \epsilon(\theta)) \cdot (1 - p) \cdot E_b(T_3)$ reflected from the object surface 3, the radiant energy $\epsilon(\theta) \cdot E_b(T_1)$ from the object surface 3 itself and the disturbance component $(1 - \epsilon(\theta)) \cdot p \cdot E_b(T_4)$ from the surrounding wall 4 at temperature $T_4$, are detected by the radiometer 1. Then, the emissivity $\epsilon(\theta)$ is determined from Eq. (17) by using the diffusely reflecting factor p associated with the object surface 3 and the temperature $T_1$ from Eq. (18) by use of the $\epsilon(\theta)$.

Figure 3A:
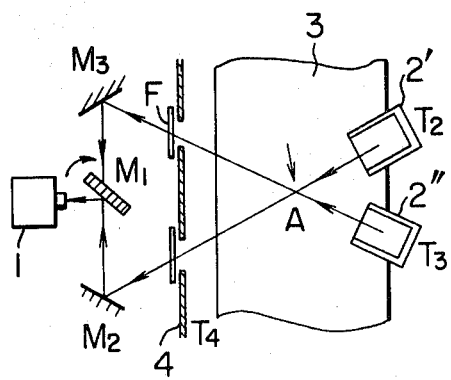
FIGS. 3a and 3b are schematic plan views.
Figure 3B:
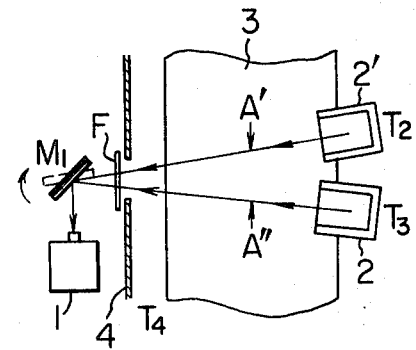
Figure 2:
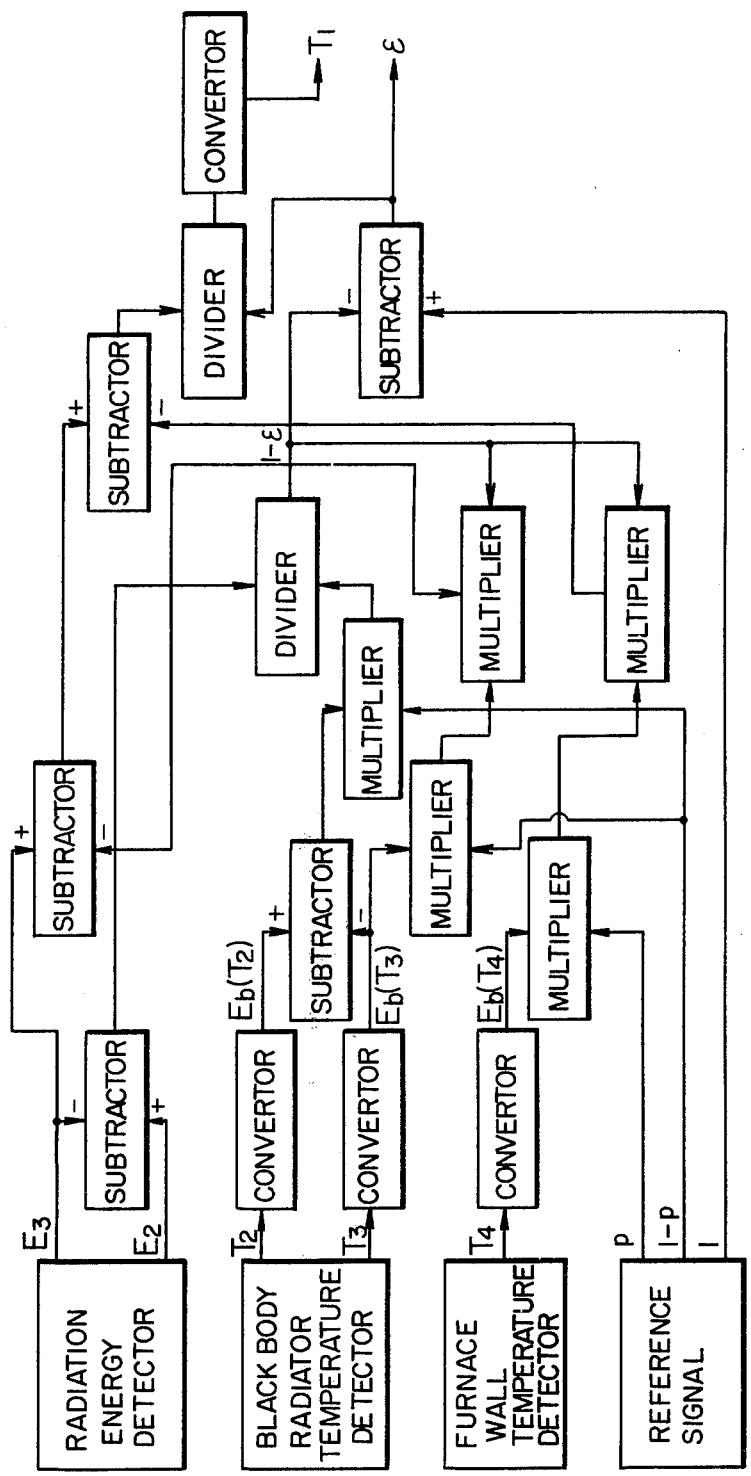
FIG. 2 is a block diagram of the arithmetic arrangement.

FIG. 2 is a block diagram of the computation for effectively implementing the method of this invention. In order to perform the operation of the arrangement of FIG. 2, it is necessary to set the black body radiator 2 to two different temperatures, $T_2$ and $T_3$ separately. To this end, two black body radiators 2' and 2" are provided separately as shown in FIG. 3a and set to the temperatures $T_2$ and $T_3$ respectively, and the radiant energy to the single radiometer 1 is supplied alternately from both the radiators 2' and 2". FIG. 3a shows this two-light flux optical system. The flux of radiant energy from each of the black body radiators 2' and 2" intersects with the other at a point A on the object surface 3 to be measured and is reflected therefrom. One of the reflected radiant energies is passed through a mirror $M_2$ to a rotating mirror $M_1$ and the other energy through a mirror $M_3$ to the rotating mirror $M_1$, so that both the radiant energies are alternately supplied to the radiometer 1 by the rotation of the mirror $M_1$. Alternatively, only the single rotating mirror $M_1$ may be used without the mirrors $M_2$ and $M_3$ to perform the two-light flux optical system as shown in FIG. 3b, although slightly different measurement points, A' and A" must be taken into consideration. In this case, it is of course necessary that the object 3 be moving or at a uniform temperature and emissivity over a certain area.

Figure 4:
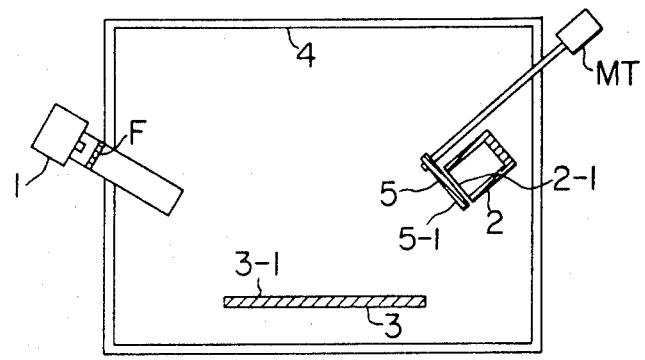
FIG. 4 is a schematic side elevational view.

Instead of using the two black body radiators 2' and 2", the single black body radiator 2 and a rotating sector 5 which is placed closely in front of the opening of the radiator 2 and is rotated by a motor MT, are provided, as shown in FIG. 4, thereby to effect the same system as the above-mentioned optical system. The black body radiator 2 is set to the temperature $T_2$. On the other hand, the surface 5-1 of the rotating sector 5 is treated to be black enough to absorb any radiant energy, or as an approximately black surface, and the temperature of such a black surface is kept much lower than the temperatures $T_1$ of the object surface 3 to be measured and $T_2$ and the black body radiator 2. Therefore, the radiant energy therefrom can be neglected as compared with the $E_b(T_1)$ and $E_b(T_2)$. The opening surface 2-1 of the black body radiator 2 is intermittently covered by the rotating sector 5 to alternately supply two different values of radiant energy to the radiometer 1 where the values are detected. If the detected value from the covered black body radiator 2 is taken as $E_1$, the following equation is obtained instead of Eq. (16):

$$E_1 = \epsilon(\theta) \cdot E_b(T_1) + \{1 - \epsilon(\theta)\} \cdot p \cdot E_b(T_4) \quad (19)$$

Since the detected value, $E_2$ from the uncovered black body radiator 2 is expressed by Eq. (15), the $\epsilon(\theta)$ is determined from both Eqs. (15) and (19) as $$\epsilon(\theta) = 1 - \frac{E_2 - E_1}{(1 - p) \cdot E_b(T_2)} \quad (20)$$

Substitution of Eq. (20) into Eq. (19) will yield $$E_b(T_1) = \frac{E_1}{\epsilon(\theta)} - \frac{1 - \epsilon(\theta)}{\epsilon(\theta)} \cdot p \cdot E_b(T_4) \quad (21)$$

Eqs. (20) and (21) are simpler than Eqs. (17) and (18). Also in the 2-light flux optical system, the same equations are obtained by making $T_3$ much lower than $T_1$ and $T_2$ so that the radiation is negligibly small. The arrangements of FIGS. 3a, 3b and 4 are disclosed in the Utility Model Laid-Open Application No. 180784/79. In the present invention, the feature is that the diffusely reflecting factor p is introduced in the equations so that the object surface to be measured need not necessarily be a perfect specularly reflecting surface, thus permitting the measurement to be performed practically.

Figure 5A:
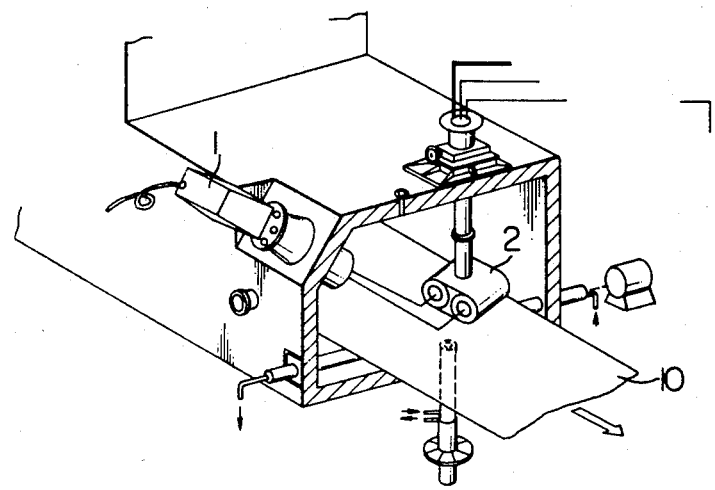
FIGS. 5a and 5b are a schematic perspective view and a side view of another embodiment.
Figure 5B:
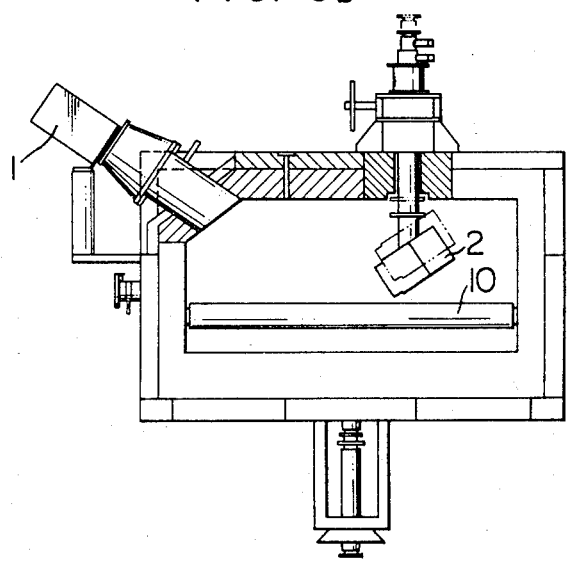

FIGS. 5a and 5b show another embodiment wherein the temperature of the heated object in a furnace and its emissivity are simultaneously measured by using a 2-light flux system corresponding to that shown by FIG. 3b.

Figure 6:
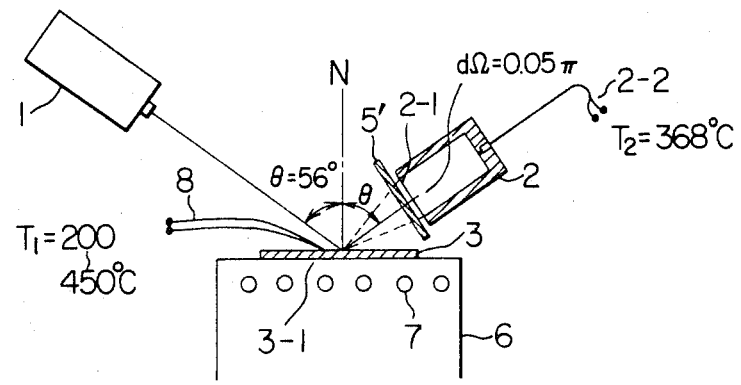
FIG. 6 is a side view of an embodiment disposed in the atmosphere.

The effect of this invention will now be described with reference to the embodiment and the experimental results. FIG. 6 schematically shows the experimental arrangement in the atmosphere without accompanying background effect. As shown in FIG. 6, the sample 3 to be measured of 100 mm$\phi$ was heated on a heating furnace 6. The radiometer 1 and the black body radiator 2 were symmetrically disposed at angles $\theta$, 56° with respect to the normal N to the sample surface. The black body radiator 2 was a hollow graphite cylinder with the opening diameter D of 50 mm$\phi$ and length L of 125 mm, and the inner wall temperature $T_2$ thereof was detected by a CA (Chromel-Alumel) thermocouple 2-2 mounted in the bottom surface. The detected temperature $T_2$ was controlled by a PID temperature control apparatus to be kept at 368° C. with a precision of ±1° C. The solid angle, $d\Omega$ viewed from the surface 3-1 to be measured was 0.05 $\pi$ster. For the radiometer 1, three different detecting elements were employed as shown in the following table:

| Detecting element | Effective wave length detected $\lambda(\mu m)$ |
|---|---|
| PbS | 2.2 |
| InSb | 5.0 |
| Thermistor-bolometer | 8.0 |

The experimental procedure is as follows. The characteristic curve of each radiometer 1 which shows the relationship between $T_2$ and $E_b(T_2)$ was first measured and then the temperature was controlled to 368° C. Subsequently, each sample 3 was heated on the heating furnace 6 by a heater 7 and the temperature of each sample surface was measured by a CA thermocouple 8 which was spot-welded onto the sample surface 3. Each sample surface was set at an arbitrary temperature $T_1$ in the range from 200° C. to 450° C. In order to directly determine the emissivity $\epsilon(\theta)$ at each temperature $T_1$, a water cooled sector 5', the surface of which was blackened was placed just before the opening 2-1 of the black body radiator 2. Thus, from the detected value $E_1$ by the radiometer 1 at that time, the $\epsilon(\theta)$ can be obtained as $$\epsilon(\theta) = \frac{E_1}{E_b(T_1)} \quad (22)$$

where $E_b(T_1)$ is a known value because it is the radiation energy from the black body radiator at $T_1$ which has been measured by the CA thermocouple 8. The $\epsilon(\theta)$ of Eq. (22) is the true emissivity of the sample 3.

The $E_1$ can be expressed by $$E_1 = \epsilon(\theta) \cdot E_b(T_1) \quad (23)$$

On the basis of the principle of the method according to this invention, the detected value $E_2$ at the time the blackened water-cooled sector 5' is removed can be expressed by $$E_2 = \epsilon(\theta) \cdot E_b(T_1) + \{1 - \epsilon(\theta)\} \cdot f \cdot E_b(T_2) \quad (24)$$

which equation is the same as Eq. (7). From Eqs. (23) and (24), the emissivity and temperature can be determined as $$\epsilon(\theta) = 1 - \frac{E_2 - E_1}{f \cdot E_b(T_2)} \quad (25)$$

$$E_b(T_1) = \frac{E_1}{\epsilon(\theta)} \quad (26)$$

The measurement precision in the method of the invention can be evaluated by comparing the true emissivity Eq. (22) and the emissivity equation (25) obtained by the method of the invention.

Table 1 lists the measured results of the samples of a cold-rolled steel sheet, a stainless steel sheet and a roughened surface aluminum plate, which are obtained by the method of the invention. In Table 1, f is determined by such a manner that the values of emissivity $\epsilon(\theta)$ computed from Eqs. (22) and (25) are the same, with each sample set at a given temperature $T_1$.

TABLE 1

| | The measured results of each sample by the method of the invention | | | | | | |
|---|---|---|---|---|---|---|---|
| Samples | $\lambda(\mu m)$ | $T_1$ (°C.) | $\epsilon(\theta)$ | f | $\bar{f}$ | $\Delta f$ | $\Delta\epsilon/\epsilon(\theta)$ | $\Delta T/T_1$ |
| Cold rolled steel sheet | 2.2 | 326 | 0.316 | 0.90 | 0.92 | ±0.03 | 0.07 | 0.007 |
| | | 327 | 0.443 | 0.91 | | | | |
| | | 369 | 0.447 | 0.94 | | | | |
| | | 390 | 0.495 | 0.94 | | | | |
| | | 410 | 0.690 | 0.94 | | | | |
| | | 410 | 0.820 | 0.89 | | | | |
| Stainless steel sheet (bright annealed) | 2.2 | 306 | 0.261 | 0.94 | 0.98 | ±0.02 | 0.06 | 0.006 |
| | | 327 | 0.300 | 0.99 | | | | |
| | | 390 | 0.305 | 1.00 | | | | |
| | | 410 | 0.356 | 1.00 | | | | |
| | | 390 | 0.338 | 0.98 | | | | |
| | | 369 | 0.339 | 0.98 | | | | |
| Shot-blast treated aluminum plate (#250) | 2.2 | 306 | 0.383 | 0.091 | 0.098 | ±0.009 | 0.15 | 0.015 |
| | | 368 | 0.424 | 0.098 | | | | |
| | | 410 | 0.440 | 0.109 | | | | |
| | | 368 | 0.434 | 0.097 | | | | |
| Cold rolled steel sheet | 5.0 | 221 | 0.144 | 0.97 | 0.97 | ±0.01 | 0.07 | 0.007 |
| | | 275 | 0.146 | 0.96 | | | | |
| | | 326 | 0.151 | 0.97 | | | | |
| | | 368 | 0.170 | 0.97 | | | | |
| | | 430 | 0.287 | 0.98 | | | | |
| Stainless steel sheet (bright annealed) | 5.0 | 221 | 0.155 | 0.98 | 0.99 | ±0.01 | 0.06 | 0.013 |
| | | 326 | 0.181 | 0.99 | | | | |
| | | 368 | 0.178 | 0.98 | | | | |
| | | 430 | 0.181 | 0.99 | | | | |
| Shot-blast treated aluminum plate (#250) | 5.0 | 221 | 0.412 | 0.14 | 0.15 | ±0.006 | 0.25 | 0.057 |
| | | 326 | 0.423 | 0.14 | | | | |
| | | 368 | 0.438 | 0.15 | | | | |
| | | 430 | 0.462 | 0.15 | | | | |
| | | 326 | 0.453 | 0.15 | | | | |
| Cold-rolled steel sheet | 8.0 | 296 | 0.138 | 0.99 | 0.99 | ±0.01 | 0.06 | 0.024 |
| | | 326 | 0.139 | 0.99 | | | | |
| | | 368 | 0.147 | 0.98 | | | | |
| | | 431 | 0.195 | 0.99 | | | | |
| | | 296 | 0.376 | 1.00 | | | | |
| Stainless sheet (bright an- | 8.0 | 296 | 0.184 | 1.01 | 1.00 | ±0.005 | 0.03 | 0.009 |
| | | 326 | 0.176 | 1.00 | | | | |
| | | 368 | 0.164 | 1.00 | | | | |
| | | 431 | 0.174 | 1.01 | | | | |

TABLE 1-continued

The measured results of each sample by the method of the invention

| Samples | λ(μm) | T₁ (°C.) | ε(θ) | f | f̄ | Δf | Δε/ε(θ) | ΔT/T₁ |
|---|---|---|---|---|---|---|---|---|
| nealed) | | | | | | | | |
| Shot-blast treated aluminum plate (#250) | 8.0 | 326 | 0.451 | 0.27 | 0.26 | ±0.005 | 0.02 | 0.009 |
| | | 368 | 0.464 | 0.26 | | | | |
| | | 431 | 0.483 | 0.26 | | | | |
| | | 368 | 0.464 | 0.26 | | | | |
| | | 326 | 0.463 | 0.26 | | | | |

In the Table:
λ(μm): Effective detected wavelength
T₁(°C.): Temperature indicated by thermocouple
ε(θ): Directly determined emissivity
f: Specularly reflecting factor
f̄: Average f
Δf: Variation of f
Δε/ε(θ): Relative error of emissivity
ΔT/T₁: Relative temperature error In Table 1, the emissivity and relative temperature error are determined by Eqs. (25) and (26) and by using the average f of f and its variation Δf, and the relative temperature error is evaluated at $T_1 = 400°$ C.

Eq (25) is rearranged with respect to f as $$f = \frac{E_2 - E_1}{\{1 - \epsilon(\theta)\} E_b(T_2)} \quad (27)$$

The variation of $\epsilon(\theta)$ is taken as $\Delta\epsilon$ corresponding to the invention Δf. Taking a logarithm on both sides of Eq. (27) and differentiating both sides thereof will yield $$\frac{\Delta f}{f} = \frac{\Delta\epsilon}{1 - \epsilon(\theta)} \quad (28)$$

From Eq. (28)

$$\frac{\Delta\epsilon}{\epsilon(\theta)} = \left(\frac{1}{\epsilon(\theta)} - 1\right) \frac{\Delta f}{f} \quad (29)$$

is obtained. From Eq. (29), it will be understood that the relative error of emissivity depends on the relative error of f and the value of the emissivity itself.

The relative error of temperature, $\Delta T/T_1$ can be derived from the well known formula:

$$\frac{\Delta T}{T_1} = \frac{\lambda \cdot T_1}{C_2} \cdot \frac{\Delta\epsilon}{\epsilon(\theta)} \quad (30)$$

Substitution of Eq (29) for Eq. (30) will give $$\frac{\Delta T}{T_1} = \frac{\lambda \cdot T_1}{C_2} \cdot \left(\frac{1}{\epsilon(\theta)} - 1\right) \frac{\Delta f}{f} \quad (31)$$

where $C_2 = 14,388$ μm·K.

The $\Delta\epsilon/\epsilon(\theta)$ and $\Delta T/T_1$ in Table 1 are determined by using the relation of $f = \bar{f}$ in Eqs. (29) and (31) and substituting $\epsilon(\theta)$ of Eq. (22) into Eqs. (29) and (30). From Table 1, it will be seen that f of the same sample approaches 1, or the sample surface approaches a specularly reflecting surface as the wavelength λ increases. Also, the relative variation Δf/f of f decreases as the λ increases. Since the emissivity and temperature determined by the method of the invention depend on the ε(θ) and λ in addition to Δf/f as shown in Eqs. (29) and (31), the measurement precision at long wavelengths are not necessarily excellent. From Table 1, it will be seen that the relative error of emissivity is minimum at λ=8 μm, while that of temperature is minimum at λ=2.2 μm.

Figure 7:
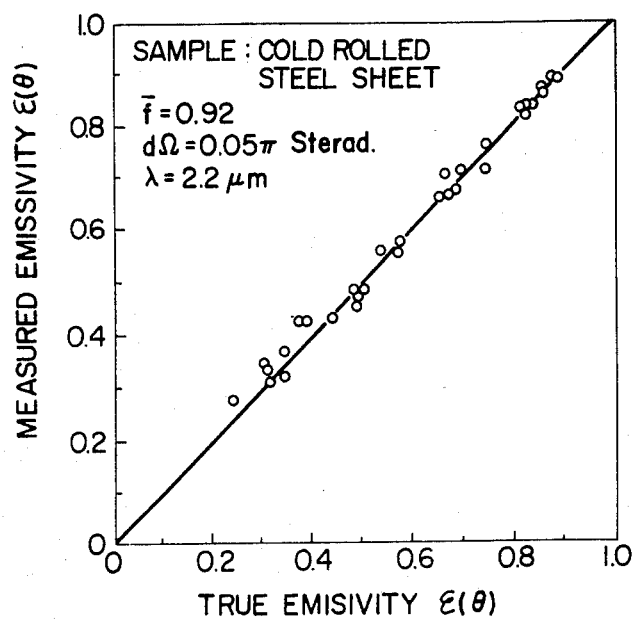
FIG. 7 is a graph showing the relation between the true emissivity and the measured emissivity according to the present invention.
Figure 8:
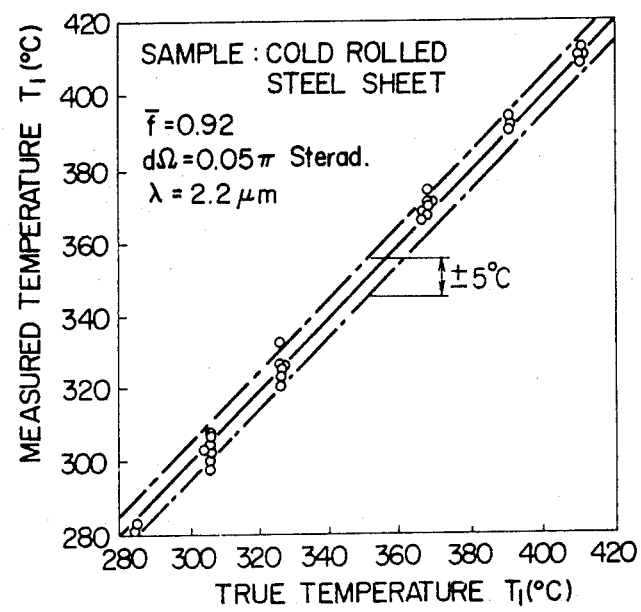
FIG. 8 is a graph showing the relation between the true temperature and the measured temperature according to the invention.

FIG. 7 is a graph of experimental results showing the relation between the emissivity (Eq. (22)) directly obtained by the thermocouple and the emissivity (Eq. (25)) by the method of the invention, for many samples of cold-rolled steel sheet at λ=2.2 μm. In this experiment, average f̄ of 0.92 was used for f. From FIG. 7, it will be seen that both emissivities take similar values irrespective of wide change of emissivity along with the formation of oxide film on the steel sheet surface due to heating. FIG. 8 similarly shows the relation between the temperature indicated by the thermocouple and that obtained by the computation of the invention. The difference therebetween is almost within ±5° C. From Table 1, and FIGS. 7 and 8, it has been understood that for the same kind of steel plates, the temperature and emissitivity can simultaneously be measured at very high precision under constant f established, irrespective of wide change of emissivity.

Figure 9:
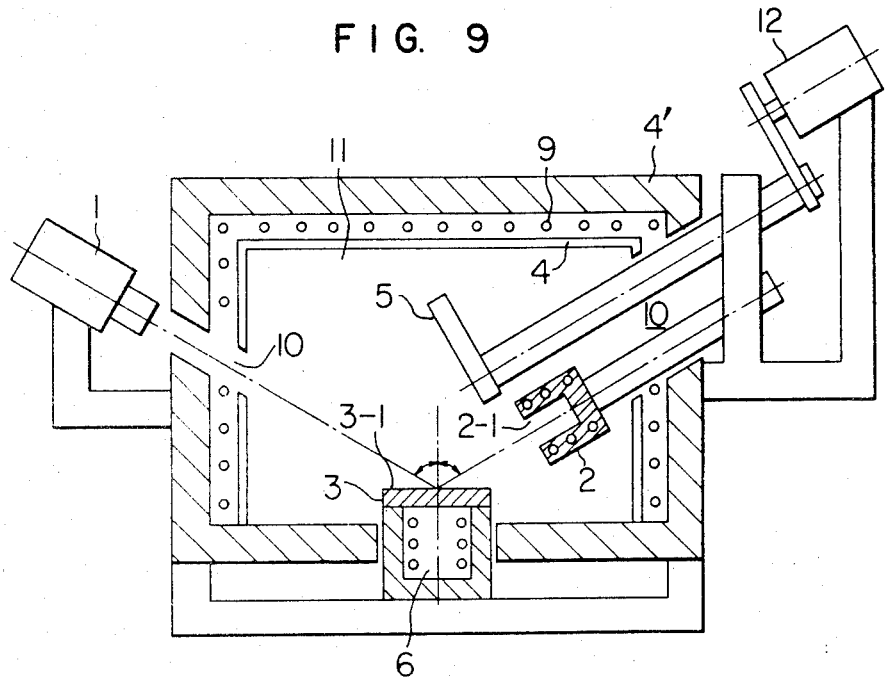
FIG. 9 is a side view of the furnace in which measurement is made.

The method of the invention is excellent particularly in removal of background noise due to its utilization of the specular reflection. Therefore, the present method is considered to be very effective for temperature measurement in a furnace. A simulation furnace was set up and the temperature in the furnace was experimentally measured by the method of the present invention. FIG. 9 schematically shows the experimental arrangement. The inner wall 4 of the simulation furnace is made of a thin steel plate and is of box-like shape. The entire surface of the inner wall 4 was coated with a black paint to have an emissivity of 0.95. The ceiling portion and side wall portion between the inner wall 4 and the outer wall 4' have three separate heaters 9 provided for radiating heat energy to the inner wall. The inner wall temperature, T₄ can be controlled independently by CA (chromel Alumel) sheathed thermocouples embedded in the steel surface (at three locations in the ceiling and side wall portions) to be substantially uniform over the entire surface. The pair of side walls of the furnace are each provided with an opening 10, 50 mm wide and 100 mm long. Through one of the holes 10 is inserted the black body radiator 2, while through the other hole 10 the interior 11 of the furnace is viewed by the radiometer 1. From the bottom side of the furnace can be inserted the sample 3 and sample heating furnace 6 into interior 11. The sample 3 can independently be heated and its temperature controlled on the heating furnace 6. Moreover, the sample 3 can be water-cooled to be kept at normal temperature instead of being heated from the bottom side. In front of the opening surface 2-1 of the black body radiator 2 is placed a blackened water-cooled sector 5, which is enabled to cover the opening surface 2-1 at intervals of a certain period of time by the driving motor 12.

In such a simulation furnace, when the inner wall temperature T₄ has become uniform over the entire surface, the furnace inner wall 4 can be considered as a black body at that temperature, which condition seems to be most severe in the radiation thermometry within the furnace.

Since the effectiveness of the principle had already been confirmed by the experiment in the ambient atmosphere, the proportion of the radiant energy which is radiated from the inner wall 4 in the furnace and reflected from the measurement surface 3-1 to the radiometer 1 where it is detected, i.e., the proportion of the background noise, was experimentally quantified.

Figure 10:
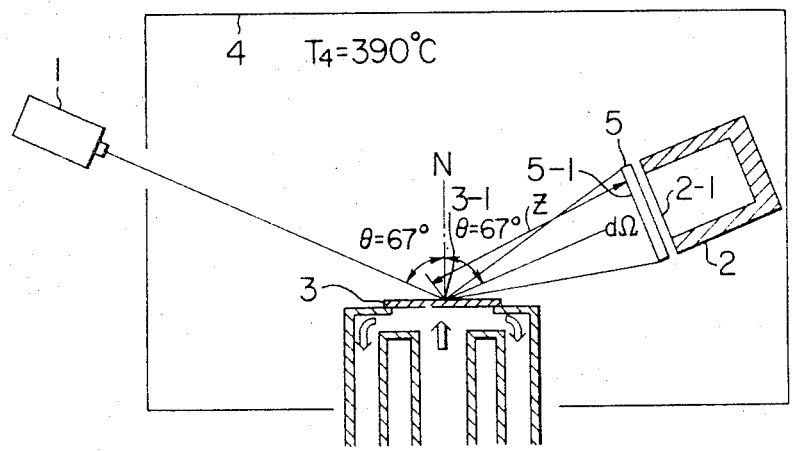
FIG. 10 is a schematic diagram of the experiment for determining the amount of the background noise.

As shown in FIG. 10, the inner wall temperature T4 of the simulation furnace was controlled to reach 390° C. The opening surface 2-1 of the black body radiator 2 was covered by the blackened water-cooled sector 5 and then each kind of sample 3 was inserted in the inside from the bottom side. Since the under side of the sample 3 was water-cooled at all times, the temperature of the sample surface was maintained at ambient temperature in the furnace. Under this condition, the reflected energy $E_s$ was detected by the radiometer 1. The major part of the detected value $E_s$ provides information on the fraction of the radiant energy $E_b(T_4)$ leaving the furnace inner wall 4 that arrives at the radiator 1 after having radiated from the furnace inner wall 4 as a black body and reflected on the surface 3-1 to be measured. Therefore, the quantity of the background noise can be determined.

The background factor $\eta$ is defined as $$E_s = \eta \cdot E_b(T_4) \tag{32}$$

$$\eta = \{1 - \epsilon(\theta)\} \cdot p \tag{33}$$

Since the emissivity of the sample 3 has previously been measured the diffusely reflecting factor p can be computed from Eq (33).

In this experiment, the $\theta$ was selected to be 67°, and the distance between the measured point and the sector was changed to change the solid angle $d\Omega$ subtending the blackened water colled sector 5; from the measured point.

Table 2 lists the experimental results. As the samples, there were used cold-rolled steel sheets and stainless steel sheets of which the emissivity changes with the progression of oxidation of sample.

TABLE 2

| | Experimental results of p and $d\Omega$ | | | |
|---|---|---|---|---|
| Samples | Effective detected wavelength $\lambda(\mu m)$ | Solid angle $d\Omega$ (ster) | Diffusely reflecting factor $p \pm -$ | Specularly reflecting factor f |
| Cold-rolled steel sheets | 2.2 | $0.05\pi$ | $0.061 \pm 0.001$ | $d\Omega = 0.05\pi$ |
| | | $0.15\pi$ | $0.04 \pm 0.003$ | 0.92 |
| | | $0.20\pi$ | $0.02 \pm 0.005$ | |
| | 5.0 | $0.05\pi$ | $0.048 \pm 0.005$ | 0.97 |
| | | $0.15\pi$ | $0.03 \pm 0.004$ | |
| | | $0.20\pi$ | $0.15 \pm 0.003$ | |
| | 8.0 | $0.05\pi$ | $0.021 \pm 0.001$ | 0.99 |
| | | $0.15\pi$ | $0.013 \pm 0.001$ | |
| | | $0.20\pi$ | $0.009 \pm 0.001$ | |
| Stainless steel sheets (bright annealed) | 2.2 | $0.05\pi$ | $0.023 \pm 0.007$ | 0.98 |
| | | $0.15\pi$ | $0.017 \pm 0.004$ | |
| | | $0.20\pi$ | $0.005 \pm 0.002$ | |
| | 5.0 | $0.05\pi$ | $0.008 \pm 0.002$ | 0.99 |
| | | $0.15\pi$ | $0.004 \pm 0.002$ | |
| | | $0.20\pi$ | $0.002 \pm 0.001$ | |
| | 8.0 | $0.05\pi$ | $0.003 \pm 0.001$ | 1.00 |
| | | $0.15\pi$ | 0.0012 | |
| | | $0.20\pi$ | 0.0005 | |

Figure 11:
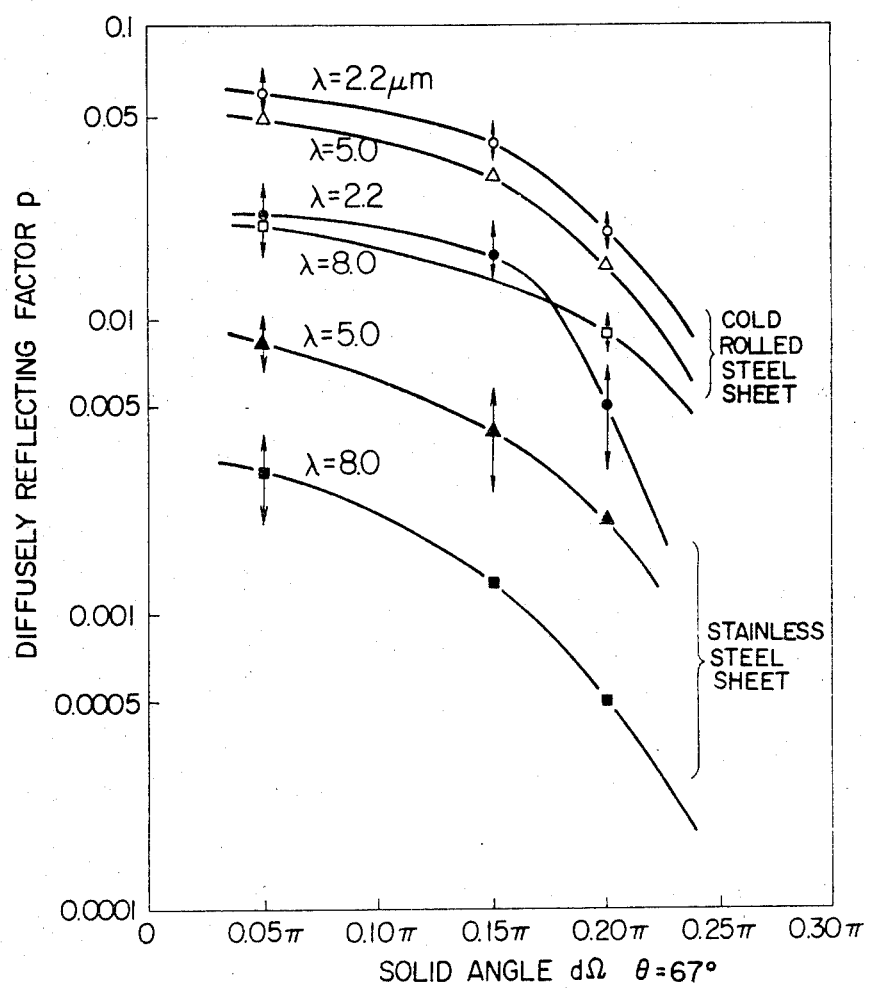
FIG. 11 is a graph showing the relation between p and dΩ measured.

By changing the distance Z from the measured point of the sample to the sector surface 5-1, the solid angle, $d\Omega = 2\pi\{1-\cos(\tan^{-1}D/2Z)\}$ subtending the sector surface (diameter of which is D) was provided, for which the background factor $\eta$ was determined from Eq. (32). This factor $\eta$ and the emissivity $\epsilon(\theta)$ of each sample were used to determine p and its variation $\Delta p$ from Eq. (33). FIG. 11 shows the relation between p and $d\Omega$. From Table 2 or FIG. 11, it will be seen that for each sample p approaches zero as the wavelength $\lambda$ increases, or the sample approaches a specularly reflecting surface. In addition, as $d\Omega$ increases, the diffuse part of reflection makes p small. The relation between p and f is given by Eq. (14). In effect, the measured f in Table 1 is also listed in Table 2. From Tables 1 and 2, it will be understood that the relation between p and f satisfies Eq. (14). Thus, the method of the invention is evidently effective in the furnace. Now let us describe the method for determining the size of the opening of the black body radiator.

In either the atmosphere or a furnace, the emissivity is given by Eq. (20). The error in temperature measurement is expressed by Eq. (31) for the atmosphere. Therefore, in the atmosphere, only Eq. (29) in which the variation of f of the sample can be replaced by the variation of emissivity $\epsilon(\theta)$ can fundamentally be used for analyzing the error. In case of the furnace, the variation of both emissivity due to change of p and the inner wall temperature T4 of the furnace must be taken into consideration. Thus, what extent of solid angle $d\Omega$ should be selected for tolerance, was considered as follows.

If an apparent measurement temperature is taken as $T_a$, the following Eq. (34) is satisfied in Eq. (19):

$$E_b(T_a) = E_b(T_1) + \frac{1 - \epsilon(\theta)}{\epsilon(\theta)} \cdot p \cdot E_b(T_4) \tag{34}$$

The variation range of $\epsilon(\theta)$ is predicted by experiment and the minimum of $\epsilon(\theta)$ is assumed to be $\epsilon(\theta) = \epsilon$ min. The $\epsilon$ min is substituted into Eq. (33), which results in $$\eta = \{1 - \epsilon(\theta)\} \cdot p \leq (1 - \epsilon \min) \cdot p \tag{35}$$

Substitution of Eq. (35) into Eq. (34) and use of Wien's formula, $E_b(T) = C_1 \cdot \lambda^{-5} \cdot \exp(-C_2/\lambda T)$, will provide following $$\exp\left(-\frac{C_2}{\lambda \cdot T_a}\right) \leq \exp\left(-\frac{C_2}{\lambda \cdot T_1}\right) + \frac{1 - \epsilon \min}{\epsilon \min} \cdot P \cdot \exp\left(-\frac{C_2}{\lambda \cdot T_4}\right) \tag{36}$$

If, now, the allowable temperature measurement error $\Delta T_a$ is less than or equal to $T_a - T_1$° C. ($\Delta T_a \leq T_a - T_1$° C.), the left side of Eq. (36) is given as $$\exp\left(-\frac{C_2}{\lambda \cdot T_a}\right) \leq \exp\left(-\frac{C_2}{\lambda(T_1 + \Delta T_a)}\right) \leq \exp\left(-\frac{C_2}{\lambda \cdot T_1}\left(1 - \frac{\Delta T_a}{T_1}\right)\right) \tag{37}$$

Thus, substitution of Eq. (37) into Eq. (36) and rearranging will yield the maximum tolerance $p_{max}$ of the diffusely reflecting factor p as $$P\max \frac{\epsilon_{min}}{1-\epsilon_{min}} \left\{ \exp\left(\frac{C_2 \cdot \Delta T_a}{\lambda \cdot T_1^2}\right) - 1 \right\} \times \quad (38)$$

$$\exp\left\{-\frac{C_2}{\lambda}\left(\frac{1}{T_1} - \frac{1}{T_4}\right)\right\}$$

In Eq. (38), giving specific values to $T_1$ and $T_4$ in the temperature measurement region and $\lambda$ will determine the $P_{max} \leq$ for the temperature measurement error within $\pm \Delta T_a/2°$ C. Then, the solid angle $d\Omega$ max for $p=p_{max}$ can be determined from FIG. 11.

Specific computation for cold rolled steel sheet and stainless steel sheet will be described.

Figure 12:
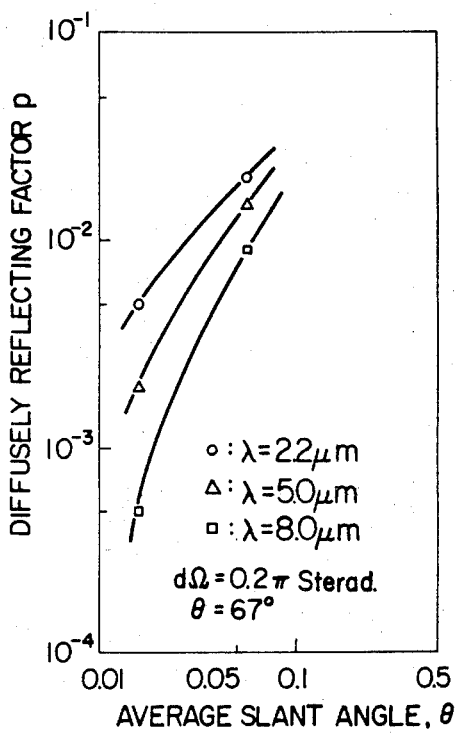
FIG. 12 is a graph showing the relation between p and $\theta_a$ measured.

Table 3 lists $P_{max}$ and $d\Omega$max necessary for restricting $\Delta T_a$ to within 10° C. for $T_1=700°$ C., $T_4=600°$ C., 700° C. and 800° C. From FIG. 11, it will be seen that the p decreases as the $\lambda$ increases, thus the background noise being reduced in proportion thereto. The $d\Omega_{max}$ necessary for restricting to the same temperature measurement error $\Delta T_a$, clearly as shown in Table 3, becomes smaller as $\lambda$ decreases. Capability of reducing $d\Omega$ max is very important from the technical view point. For stainless steel sheets it is possible to make the solid angle very small. Description will next be made of the method of determining p based on the roughness of the object surface to be measured. p represents the degree of the diffuse reflection in the direction of angles with respect to the normal to the sample surface. For this reason, it can be considered that there is a correlation between p and an average slant angle $\theta_a$ showing the surface roughness of the sample surface. In effect, the relation between p and $\theta_a$ for $d\Omega=0.2\pi$ rad from the results of Table 2 is illustrated in FIG. 12.

TABLE 3

Computed results pf $p_{max}$ and $d\Omega_{max}$ necessary for providing temperature measurement error within ±5° C.

| Sample | Effective wave length $\lambda(\mu m)$ | Minimum emissivity $\epsilon$ min | Sample temp. | Furnace Wall Temp | $p_{max}$ | Solid angle $d\Omega$ (X$\pi$ ster.) |
|---|---|---|---|---|---|---|
| Cold rolled steel sheet | 2.2 | 0.25 | 973 | 873 | 0.051 | 0.1$\pi$ |
| | | | | 973 | 0.024 | 0.19$\pi$ |
| | | | | 1,073 | 0.0127 | 0.22$\pi$ |
| | 5.0 | 0.15 | 973 | 873 | 0.012 | 0.21$\pi$ |
| | | | | 973 | 0.005 | 0.25$\pi$ |
| | | | | 1,073 | 0.004 | 0.26$\pi$ |
| | 8.0 | 0.08 | 973 | 873 | 0.004 | 0.25$\pi$ |
| | | | | 973 | 0.0017 | 0.27$\pi$ |
| | | | | 1,073 | 0.0014 | 0.28$\pi$ |
| Stainless steel sheet (bright annealed) | 2.2 | 0.30 | 973 | 873 | 0.066 | 0 |
| | | | | 973 | 0.031 | 0 |
| | | | | 1,073 | 0.016 | 0.15$\pi$ |
| | 5.0 | 0.15 | 973 | 873 | 0.0076 | 0.07 |
| | | | | 973 | 0.0054 | 0.12 |
| | | | | 1,073 | 0.0046 | 0.14 |
| | 8.0 | 0.16 | 973 | 873 | 0.0043 | 0 |
| | | | | 973 | 0.0037 | 0 |
| | | | | 1,073 | 0.0031 | 0.05$\pi$ |

Figure 13:
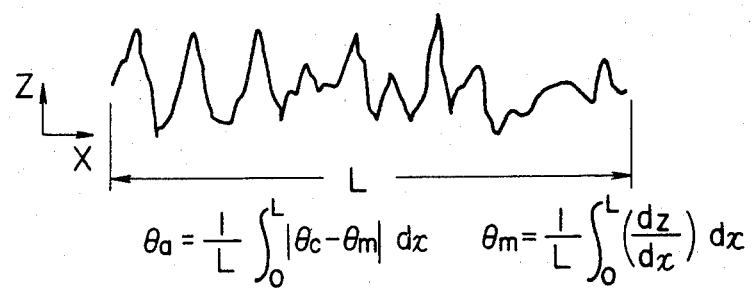
FIG. 13 shows the definition of the average inclination angle $\theta_a$.

Here, if the slant angle $\theta_C$ of roughened surface is expressed by dz/dx, $\theta_a$ is defined as shown in FIG. 13.

$$\theta_a = \frac{1}{L} \int_0^L |(\theta_C - \theta_m)| d\Omega \quad (39)$$

with the center line of $$\theta_m = \frac{1}{L} \int_0^L \theta_C dx \quad (40)$$

As described in detail above, if in the furnace, a solid angle necessary for the surface roughness of the sample surface is determined and the size of the opening of the black body radiator and the distance Z to the surface to be measured are established, it will be possible to measure the temperature and emissivity with a predetermined precision. If, in this case, the shape of the object to be measured, and change of shape due to transportation or heating are taken into account, the precision of measurement will be enhanced.

This invention is particularly effective for an object where it is necessary to measure its temperature and emissivity in the case where the object surface to be measured is generally rough and has a non-specular reflecting characteristic. In addition to the above, since the background noise can be eliminated simultaneously, the temperature of steel sheets in the furnace where the emissivity widely changes with the progression of oxidation, can very effectively be measured.

Recently, constructions of new continuous annealing furnaces have been progressing. Unlike the conventional furnace, the new furnace fully takes the energy saving idea which is now necessary and it is sought to lower energy costs by improvement of the thermal efficiency. To this end, in place of using reducing gases, a rapid heating system by direct heating burners is adopted. The furnace of this heating system is called NOF (non oxidizing furnace). Thus, the steel sheet or plate in the furnace is still oxidized by the weak oxidizing atmosphere in the furnace during its travelling, so that the emissivity thereof is widely changed. This invention fully solves both the background noise and emissivity problems and thus is remarkably effective for temperature measurement in the NOF. Moreover, since in the NOF a small amount of unburned oxygen ($O_2$) brings about a delicate action on the oxide film formation on the steel plate, the measurement of the emissivity will contrarily provide a useful information on the oxide film or oxidized condition.

In addition, according to the invention, even when an atmosphere or a sealing glass filter exists in the optical path of the measuring system, accurate temperature measurement can be done by measuring their transmittance. If, for example, in Eqs. (15) and (16), the energies $E_2$ and $E_3$ detected by the radiometer are absorbed by a transmittance factor K ($0<K<1$), the following equations are obtained corresponding to Eqs. (15) and (16):

$$E_2/K = \epsilon(\theta) \cdot E_b(T_1) + \{1 - \epsilon(\theta)\} \cdot (1-p) \cdot E_b(T_2) + \quad (41)$$
$$\{1 - \epsilon(\theta)\} \cdot p \cdot E_b(T_4)$$

$$E_3/K = \epsilon(\theta) \cdot E_b(T_1) + \{1 - \epsilon(\theta)\} \cdot (1-p) \cdot E_b(T_3) + \quad (42)$$
$$\{1 - \epsilon(\theta)\} \cdot p \cdot E_b(T_4)$$

From Eqs. (41) and (42), the emissivity $\epsilon(\theta)$ is obtained as $$\epsilon(\theta) = 1 - \frac{(E_2 - E_3)/K}{(1-p)\{E_b(T_2) - E_b(T_3)\}} \quad (43)$$

Substitution of the $\epsilon(\theta)$ into Eq. (42) will give $$E_b(T_1) = \frac{E_3/K}{\epsilon(\theta)} - \frac{1-\epsilon(\theta)}{\epsilon(\theta)} \cdot (1-p) \cdot \quad (44)$$

$$E_b(T_3) - \frac{1-\epsilon(\theta)}{\epsilon(\theta)} p \cdot E_b(T_4)$$

When the K changes at all times, the radiant energy from said black body radiators or a third reference black body radiator which is newly provided, is directly detected via a constant optical path not via the object surface to be measured, either by the radiometer or by a second newly provided radiometer. Thus, K is determined by the change of the detected value and substituted into Eqs. (43) and (44), from which $\epsilon(\theta)$ and temperature $T_1$ can be found with high precision irrespective of the change of the value K.

Selection of a proper environment where the experimental arrangement is located will prevent change of the transmittance factor K due to the absorption of radiant energy by the atmosphere. That is, a gas which is transparent to the wavelength used (for example, an inert gas) is introduced into the optical path. This permits a stable, known K to be established even in the atmosphere where the factor K is widely changed, thus enabling correct measurement.

Figure 14:
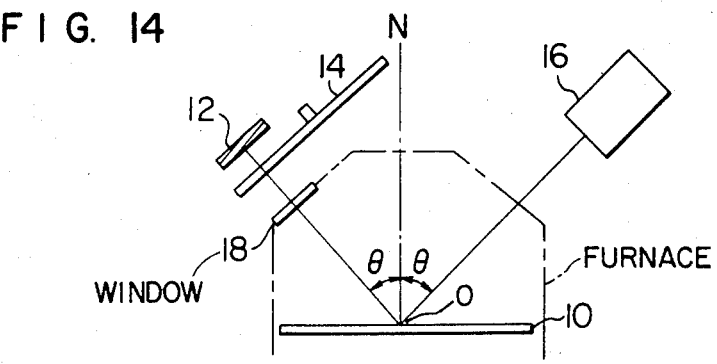
FIG. 14 is an explanatory drawing useful for explaining a second embodiment of the invention.
Figure 15A:
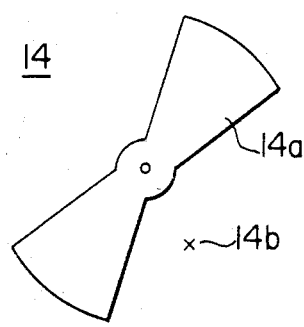
FIGS. 15a and 15b are explanatory drawings for explaining the rotating section.
Figure 15B:
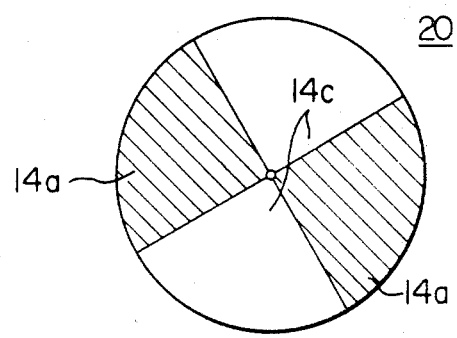

Heretofore explanation has been made mainly on the method utilizing a black body radiator or radiators, however, according to the basic concept of the present invention, use of such black body reflector is not necessarily indispensable, but entirely the same effect can be obtained by using a reflecting surface such as a plane mirror. This type of the method and apparatus as a second aspect of the present invention will now be explained. In FIG. 14, reference numeral 10 denotes an object the temperature of which is to be measured, 12 a reflecting surface, 14 a rotating sector, and 16 a radiometer. The object 10 is, for example, a heated steel strip moving in the furnace. In this case, the reflecting surface 12 and the rotating sector 14 are placed outside the furnace, the object 10 can be observed through a window 18. The radiometer 16 is also provided outside the furnace. The reflecting surface 12 and the radiometer 16 are symmetrically disposed at angles $\theta$ with respect to the normal N-O to the object surface. The reflecting surface 12 is a plane surface perpendicular to the straight line which connects the point 0 to the reflecting surface. Thus, the following radiant-ray path is formed. The object 10 at temperature T radiates radiant ray of $\epsilon(\theta) \cdot E_b(T)$ in almost all directions, where $\epsilon(\theta)$ represents the emissivity in the $\theta$-direction. The radiant ray, $\epsilon(\theta), E_b(T)$, emitted directly toward the radiometer 16, $\epsilon(\theta) \cdot E_b(T)$, enters into the radiometer 16. At the same time, the radiant ray toward the reflecting surface 12 is reflected therefrom and then specularly reflected from the object surface at point 0 into the radiometer 16. In front of the surface 12, or on the object 10-side thereof is disposed the rotating sector 14, which has a blade portion 14a as an absorbing surface of radiant energy as shown in FIG. 15 (a) and defines a space 14b between its blades. The sector 14 is rotated by a motor to absorb the radiant ray from the object 10 and cut off the radiant ray from the reflecting surface 12 when its blade portion 14a intersects the line 12-0. Since the reflecting surface 12 and the rotating sector 14 are maintained at a temperature sufficiently much lower than that of the object 10, for instance, by water cooling the interior thereof the radiant energy therefrom can be neglected. When the sector 14 absorbs and cuts off the radiant ray, the radiant energy entered into the radiometer 16 is only the energy emitted from the object 10 itself. In other words, there is a possibility that the radiant energy from the furnace wall is reflected from the object surface into the radiometer 16, but the possible reflected energy is cut off by the sector 14 so as to be prevented from entering into the radiometer 16. This aspect is an advantageous point of this specular reflection type radiation thermometry. This specularly reflecting property becomes more effective the greater the angle $\theta$ is. Since the radiant energy entering into the radiometer 16 is as described above, the following relationship is satisfied:

$$E_1 = \tau \cdot \epsilon(\theta) \cdot E_b(T) \quad (45)$$

$$E_2 = \tau \cdot [\epsilon(\theta) \cdot E_b(T) + \gamma_a \cdot \tau^2 \cdot \epsilon(\theta)(1-\epsilon\theta) \cdot (1-p) \cdot E_b(T)] \quad (46)$$

where $E_1$ and $E_2$ represent detected energies by the radiometer 16 in the cases where the sector 14 is operated to shield or not, respectively, $\tau$ the transmittance factor of a filter, in this example, the window 18 provided in the wall of the furnace, $\gamma_a$ the effective reflecting factor of the mirror 12, and p the diffusely reflecting factor of the object surface. From Eqs. (45) and (46), the following relationship is obtained:

$$\frac{E_2}{E_1} = 1 + \gamma_a \cdot \tau^2 (1-\epsilon(\theta))(1-p)\epsilon(\theta) = \quad (47)$$

$$1 - \frac{1}{\gamma_a \tau^2 (1-p)} \left( \frac{E_2}{E_1} - 1 \right)$$

Eq. 47 has the general form $$\epsilon(\theta) = 1 - C(G-1) \quad (48),$$

where C is a constant and G is variable, as discussed below. From Eq. (45) is derived $$E_b(T) = \frac{E_1}{\tau \cdot \epsilon(\theta)} \quad (49)$$

Figure 16:
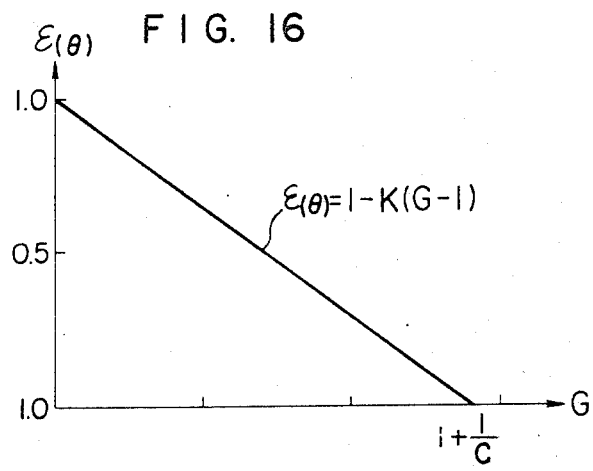
FIG. 16 is a graph showing the relation between G and $\epsilon_\theta$.

From Eqs. (48) and (49), the emissivity $\epsilon(\theta)$ and temperature T of the object are determined. In this temperature measurement, G or $E_2/E_1$ $$\frac{1}{\gamma_a \cdot \tau^2 (1-p)}$$

is actually measured, and C, or $$\frac{1}{\gamma_a \cdot \tau^2 (1-p)}$$

is treated as a constant. $\gamma_a$ and $\tau$ are maintained constant under strict maintenance control. While, p is the diffusely reflecting factor of the object to be measured, and thus it is troublesome to measure each time the emissivity and temperature of the object. Therefore p is measured beforehand and its value is used for the subsequent measurement. Thus, in order to perform this measurement method with little error, it is necessary that the measured values not be deviated greatly from the predicted values. If C is constant, the relation between emissivity $\epsilon(\theta)$ and G becomes linear as shown in FIG. 16.

Figure 17:
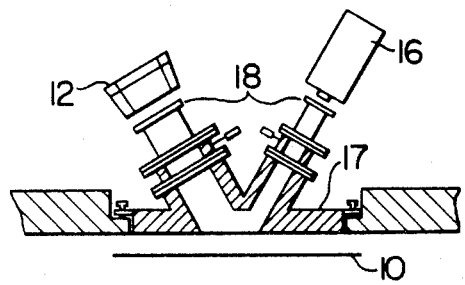
FIG. 17 is a plan view where a radiometer and a black body radiator are disposed on a watercooled base plate or chamber.

In the case where the object to be measured is an article heated in a furnace, a radiometer 16 and a reflecting surface 12 are disposed on a water-cooled flat chamber or base plate 17, as shown in FIG. 17 and said water-cooled flat chamber is embedded in the furnace wall such that it faces the article to be measured. By virtue of this construction, stray radiation (background noise) coming from the surrounding furnace wall can be shielded and further the extent of radiation from the watercooled chamber itself can be neglected, consequently, the principle of the present invention is also applicable.

Figure 18:
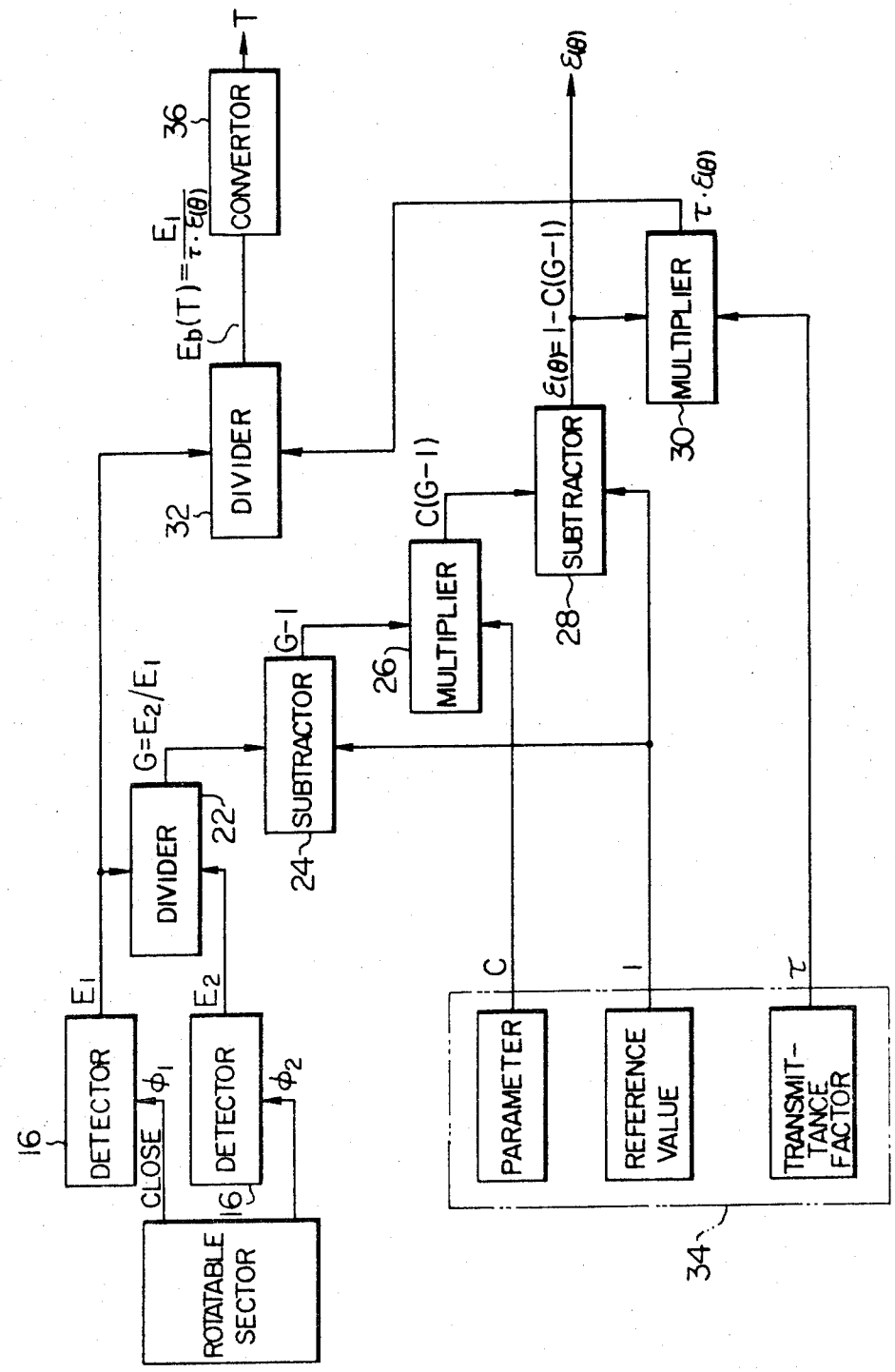
FIG. 18 is a block diagram of the arithmetic unit applied for the invention.

FIG. 18 shows an arithmetic unit for computing $\epsilon(\theta)$ and $E_b(T)$. The output of the radiometer 16 is sampled by the application of clocks $\phi_1$ and $\phi_2$ synchronized with the rotation of the sector 14 to appear as $E_1$ and $E_2$, which are applied to a divider 22 so as to produce therefrom G, or $E_2/E_1$. A standard generator 34 generates a constant 1 and supplies it to a substractor 24 where $G-1$ is produced. The standard generator 34 also generates constant, C and supplies it to a multiplier 26 where $C(G-1)$ is produced. At a subtractor 28 the $C(G-1)$ is subtracted from constant, 1 to be $1-C(G-1)$, or emissivity $\epsilon(\theta)$ of the object. In addition, the standard generator 34 generates transmittance factor $\tau$ and supplies it to a multiplier 30 where $\tau \cdot \epsilon(\theta)$ is produced. This $\tau \cdot \epsilon(\theta)$ is applied to a divider 32 from which $E_b(T)$, or $$\frac{E_1}{\tau \cdot \epsilon(\theta)}$$

is produced. Subsequently, the temperature T of the object is determined by a radiant energy-to-temperature converter 36.

Figure 19:
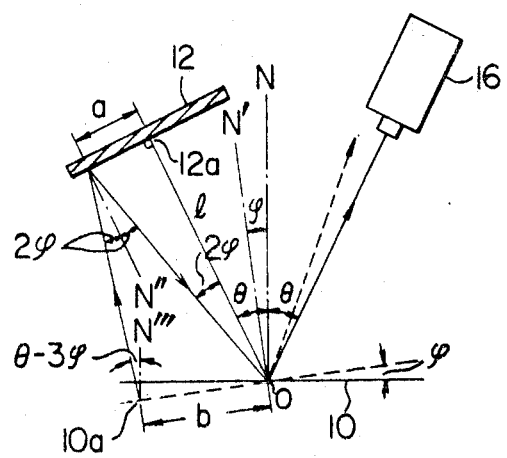
FIGS. 19, 20 and 22 are explanatory side views showing the path of the radiant ray where the object to be measured is tilted.

If the object 10 is a strip which is carried in the furnace, the surface of the object is moved up and down, or tilted from time to time, and in some cases the radiant ray specularly reflected from the object surface does not enter the radiometer. To prevent this, the reflecting surface or mirror must have a predetermined width as a plane surface or mirror. This example will be described with reference to FIG. 19. When the object 10 is tilted by angle $\phi$, the radiant ray which has passed via the surface O of the object 10, the center 12a of the mirror 12, again the object surface O to the radiometer 16, will deviate away from the radiometer 16 as indicated by a broken line. Instead, the radiant ray radiated from a point 10a of the object 10 enters the radiometer 16 as indicated by a solid lines each indicated with arrow. Thus, the width of the mirror 12 may be determined conversely in view of the relationship mentioned as above. Specifically, since the length and angle as illustrated have a relation of $$a = 1 \cdot \tan 2\phi \tag{50}$$

-continued $$b = \frac{2l \sin 2\phi}{\cos(\theta - 3\phi)} \tag{51}$$

then the size of the reflecting surface can be determined so that the value a exists for the predicted maximum value of $\phi$.

Figure 20:
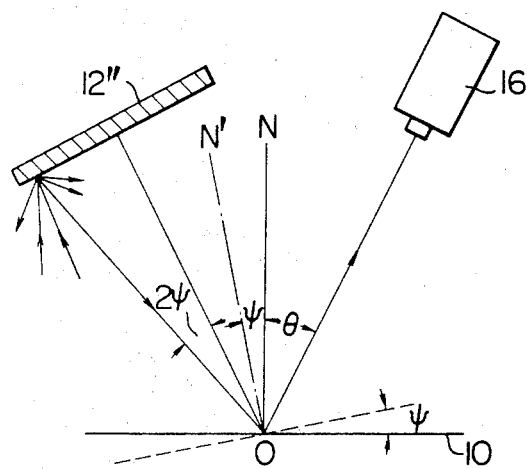

A diffusely reflecting surface 12" as shown in FIG. 20 is also effective, particularly when the object to be measured is considerably inclined or tilted.

This is because as shown in the FIG. 20, such a diffusely reflecting surface 12" will reflect rays of radiation incident from whatever direction in all directions without fail, there always exists a radiation ray component which reflects on the measuring spot 0 on the surface of the object 10 and goes toward the radiometer 16, even if the object surface 10 is largely inclined or tilted. Accordingly, such diffusely reflecting surface can be more conveniently applied to operating conditions where the object to be measured is subjected to undesirable vibration and/or tilting.

The use of a concave mirror or reflecting surface in place of a plane reflecting surface brings about a meritorious effect capable of reducing the size of an opening in the wall of a furnace through which rays of radiation pass.

Figure 21:
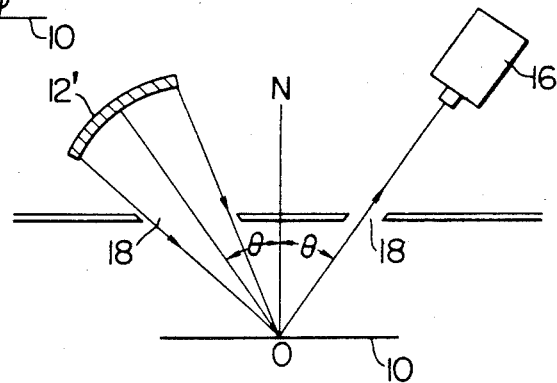
FIG. 21 is a explanatory side view where a concave reflecting surface is used.

As shown in FIG. 21, when the object 10 to be measured is placed in a furnace and a concave mirror 12''' disposed outside, an opening 18 in the wall of the furnace can be made small because the radiation rays are focussed on the point 0 on the surface of the object 10.

Figure 22:
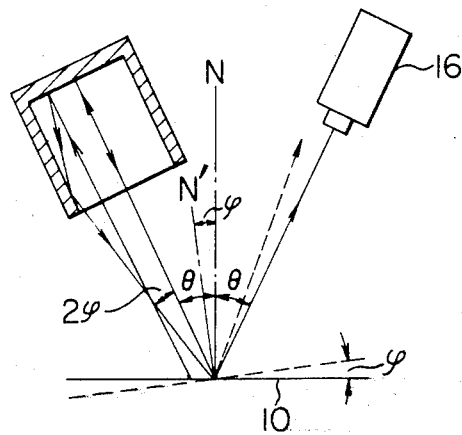

FIG. 22 shows use of a cavity-type reflecting mirror. When the object 10 is tilted by angle $\phi$, multireflection occurs as shown by arrow lines and thereby the effective reflecting factor $\gamma_a$ may change. In this respect, a plane mirror is excellent as a reflecting surface.

The rotating sector 14 may be a rotating disc formed of a reflecting surface 14c and absorbing surface 14a for radiant ray as shown in FIG. 15 (b). In this case, the reflecting surface 14c serves as the reflecting mirror 12 simultaneously. The absorbing surface 14a may be an air gap (or cavity). In some case, the radiometer 16 is of a scanning type, and for use of this scanning type radiometer, the absorbing surface is disposed adjacent to the reflecting mirror 12 so that the radiometer 16 scans the reflecting mirror and the absorbing surface alternately. In this case, the rotating sector is not necessary.

According to the first embodiment of the invention, the radiometer and the black body radiator are symmetrically and specularly disposed with respect to the normal to the surface to be measured, and two different amounts of radiant energies are alternately emitted from the black body radiator toward the surface to be measured, thereby to measure the temperature and emissivity of the object to be measured in which case the diffusely reflecting factor p is introduced into the method, which is originally applicable only to the perfect specularly reflecting surface. Thus the object to be measured is broadened to the non-perfect diffusely reflecting surface. The present invention clarified the close relation between the p and the roughness of the surface to be measured and derived a measurement procedure based on the relation between the p and the wavelength to be detected and the solid angle subtending the diameter of the opening of the black body radiator from the surface to be measured and further enabled the countermeasure against the variation of the transmittance factor K, thus realized quite a novel temperature measurement.

According to the second embodiment of the invention, it is possible to advantageously perform a self-reference type specularly reflecting radiation temperature measurement with no use of the black body furnace. While this temperature measurement is advantageous to measure the temperature of the object in the furnace, it may of course be used for other purposes.

We claim:

1. A method for measuring the surface temperature $T_1$ and emissivity $\epsilon(\theta)$ at an angle $\theta$, of an object being heated in a furnace, the surface of said object being non-specularly reflecting, said furnace having a wall temperature $T_4$, said method comprising the steps of:
determining a diffusely reflecting factor p for the material and surface roughness of said object where said roughness inhibits accurate measurement of $T_1$ should specularity of the surface be assumed, to account for the non-specularly reflecting condition of said surface;
measuring $T_4$;
positioning a radiometer and at least one black body radiator specularly and symmetrically at angles $\theta$ with respect to a normal to said surface of said object;
with said black body radiator at a temperature $T_2$, emitting radiant energy $E_b(T_2)$ toward said surface;
with said radiometer, detecting radiant energy $E_2$ as a result of energy emitted by and reflected from said surface;
with said black body radiator at a temperature $T_3 \neq T_2$, emitting radiant energy $E_b(T_3)$ toward said surface;
with said radiometer, detecting radiant energy $E_3$ as a result of energy emitted by and reflected from said surface;
determining $\epsilon(\theta)$ in accordance with the relationships $$\epsilon(\theta) = 1 - \frac{E_2 - E_3}{(1-p)\{E_b(T_2) - E_b(T_3)\}} \text{; and}$$

determining $T_1$ in accordance with the relationship $$E_b(T_1) = \frac{E_3}{\epsilon(\theta)} - \frac{1-\epsilon(\theta)}{\epsilon(\theta)} \cdot (1-p) \cdot E_b(T_3)$$
$$- \frac{1-\epsilon(\theta)}{\epsilon(\theta)} \cdot p \cdot E_b(T_4).$$

2. A method according to claim 1, wherein the optical path between said surface of said object and said radiometer has a transmittance factor K and said emissivity $\epsilon(\theta)$ and temperature $T_1$ are determined in accordance with the relationships:

$$\epsilon(\theta) = 1 - \frac{(E_2 - E_3)/K}{(1-p)\{E_b(T_2) - E_b(T_3)\}} \text{; and}$$

$$E_b(T_1) = \frac{E_3/K}{\epsilon(\theta)} - \frac{1-\epsilon(\theta)}{\epsilon(\theta)} \cdot (1-p) \cdot E_b(T_3) -$$
$$\frac{1-\epsilon(\theta)}{\epsilon(\theta)} p \cdot E_b(T_4).$$

3. An apparatus for measuring the surface temperature $T_1$ and emissivity $\epsilon(\theta)$ at an angle $\theta$, of an object being heated in a furnace, the surface of said object being non-specularly reflecting and said furnace having a wall temperature $T_4$, said apparatus comprising:
a radiometer and at least one black body radiator specularly and symmetrically positioned at angles $\theta$ with respect to a normal to said surface of said object;
means for operating said radiator at a temperature $T_2$ to emit radiant energy $E_b(T_2)$ toward said surface of said object;
first means for detecting with said radiometer the radiant energy $E_2$ resulting from energy emitted by and reflected from said surface of said object while $E_b(T_2)$ is emitted;
means for operating said radiator at a temperature $T_3 \neq T_2$ to emit radiant energy $E_b(T_3)$ toward surface of said object;
second means for detecting with said radiometer the radiant energy $E_3$ resulting from energy emitted by and reflected from said surface of said object while $E_b(T_3)$ is emitted;
means for determining $\epsilon(\theta)$ in accordance with the $$\epsilon(\theta) = 1 - \frac{E_2 - E_3}{(1-p)\{E_b(T_2) - E_b(T_3)\}},$$

where p is the diffusely reflecting factor for the material and roughness of the object, where said roughness inhibits accurate measurement of $T_1$ should specularity of the surface be assumed;
means for measuring $T_4$; and
means for determining $T_1$ in accordance with the relationship $$E_b(T_1) = \frac{E_3}{\epsilon(\theta)} - \frac{1-\epsilon(\theta)}{\epsilon(\theta)} \cdot (1-p) \cdot E_b(T_3)$$
$$- \frac{1-\epsilon(\theta)}{\epsilon(\theta)} \cdot p \cdot E_b(T_4).$$

4. An apparatus according to claim 3, wherein the optical path between said surface of said object and said radiometer has a transmittance factor K, and said emissivity and temperature are determined in accordance with the relationships:

$$\epsilon(\theta) = 1 - \frac{(E_2 - E_3)/K}{(1-p)\{E_b(T_2) - E_b(T_3)\}} \text{; and}$$

$$E_b(T_1) = \frac{E_3/K}{\epsilon(\theta)} - \frac{1-\epsilon(\theta)}{\epsilon(\theta)} \cdot (1-p) \cdot E_b(T_3) -$$
$$\frac{1-\epsilon(\theta)}{\epsilon(\theta)} p \cdot E_b(T_4).$$

5. Apparatus according to claim 3, wherein said first and second means for detecting comprise switching means disposed in the optical path between said radiometer and said at least one black body radiator for selectively directing radiant energy $E_b(T_2)$ or $E_b(T_3)$ toward said radiometer.

6. A method for measuring the surface temperature T and emissivity $\epsilon(\theta)$ at an angle $\theta$ of an object being heated in a furnace, the surface of said object being non-specularly reflecting; and said surface having a wall temperature $T_4$, said method comprising the steps of:
determining a diffusely reflecting factor p for the material and surface roughness of said object where said roughness inhibits accurate measure-means for alternately absorbing said radiant energy $E_b(T_2)$ or passing said radiant energy $E_b(T_2)$ toward said surface of said object;

means for detecting with said radiometer a radiant energy $E_1$ while said radiant energy $E_b(T_2)$ is being absorbed and a radiant energy $E_2$ while said radiant energy $E_b(T_2)$ is being passed;

means for determining $\epsilon(\theta)$ in accordance with the relationship $$\epsilon(\theta) = 1 - \frac{E_2 - E_1}{(1-p) \cdot E_b(T_2)},$$

where p is the diffusely reflecting factor for the material and roughness of the object, where said roughness inhibits accurate measurement of $T_1$ should specularity of the surface be assumed;

means for determining $T_1$ in accordance with the relationship $$E_b(T_1) = \frac{E_1}{\epsilon(\theta)} - \frac{1 - \epsilon(\theta)}{\epsilon(\theta)} \cdot p \cdot E_b(T_4).$$

15. Apparatus according to claim 14, wherein said means for alternately absorbing or passing comprises a sector having alternate portions respectively for absorbing or passing radiant energy and means for moving said sector in the optical path between said radiator and said surface of said object.

* * * * *